(12) United States Patent
Goeddel

(10) Patent No.: US 6,487,254 B1
(45) Date of Patent: Nov. 26, 2002

(54) METHODS AND DEVICES FOR ESTIMATING QAM SYMBOL SEQUENCES OVER FLAT FADING CHANNELS USING MULTIPLE OFFSET SEQUENCES

(75) Inventor: Thomas William Goeddel, Fair Haven, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/306,836

(22) Filed: May 7, 1999

(51) Int. Cl.[7] .............................................. H04L 27/38
(52) U.S. Cl. ...................... 375/261; 375/316; 375/340; 329/304
(58) Field of Search ................................. 375/260, 261, 375/281, 285, 298, 316, 340, 346, 347, 377; 370/206, 207; 455/59, 60; 329/304

(56) References Cited

U.S. PATENT DOCUMENTS

| | | | | |
|---|---|---|---|---|
| 4,899,367 A | * | 2/1990 | Sampei ........................ 375/264 |
| 5,519,730 A | * | 5/1996 | Jasper et al. ................. 375/260 |
| 5,862,175 A | * | 1/1999 | Sugiyama et al. ........... 375/219 |
| 6,075,808 A | * | 6/2000 | Tsujimoto .................... 375/143 |
| 6,188,717 B1 | * | 2/2001 | Kaiser et al. ................ 375/148 |

* cited by examiner

Primary Examiner—Stephen Chin
Assistant Examiner—Chieh M. Fan
(74) Attorney, Agent, or Firm—Troutman Sanders Mays & Valentine

(57) ABSTRACT

A sequence of Quadrature Amplitude Modulated ("QAM") data symbols is received and its' fading process estimated. The estimated fading process is then used to generate estimates of the identity of the symbols themselves. Instead of using the single, received sequence to complete the fading process estimates, multiple offset sequences are used. For a given signal-to-noise ratio, the resulting fading process estimates and data symbol estimates provide for reduced bit error rates.

36 Claims, 2 Drawing Sheets

METHODS AND DEVICES FOR ESTIMATING QAM SYMBOL SEQUENCES OVER FLAT FADING CHANNELS USING MULTIPLE OFFSET SEQUENCES

BACKGROUND OF THE INVENTION

Traditional techniques for estimating sequences of data symbols transmitted over unknown, fast fading channels have used sequential processing across the many symbols in a given sequence. That is, all of the symbols are processed in the order they are received in order to estimate the entire sequence. Estimation is necessary because the exact sequence of symbols is unknown. This sequential technique is subject to inaccuracies, however.

Accordingly, it is an object of the present invention to provide for methods and devices which allow for the accurate estimation of QAM symbol sequences over flat-fading channels.

It is another object of the invention to provide for methods and devices which improve the estimation of QAM symbol sequences over flat-fading channels by providing for reduced bit error rates.

It is yet a further object of the present invention to provide for methods and devices which improve the estimation of QAM symbol sequences over flat-fading channels by separating a received QAM sequence of data symbols into multiple, separate sequences of symbols, each separate sequence being offset in time, and generating an estimate of the sequence of symbols and fading process for each separated sequence.

Other objectives, features and advantages of the present invention will become apparent to those skilled in the art from the following description taken in conjunction with the accompanying drawings.

SUMMARY OF THE INVENTION

In accordance with the present invention there are provided methods and devices for splitting a received sequence of QAM data symbols into multiple, preferably non-overlapping, sequences. Once the multiple sequences have been created, estimations are then generated independently for each of these multiple sequences. The results of these independent estimation processes are then combined and a final estimation of a fading process is generated. From this estimation the state of each unknown symbol can be determined. One type of QAM signal is an M-Phase-Shift Keying ("M-PSK") signal. Reduced bit error rates have been achieved for sequences of 8-PSK data symbols due to the increased diversity from the use of multiple estimators. Degradation in the estimation process caused by phase ambiguities is also reduced. The present invention is directed at flat-fading, low-dispersion channel and is not directly applicable to frequency-selective, fading environments.

The present invention and its advantages can be best understood with reference to the drawings, detailed description of the preferred embodiments and claims that follow.

DETAILED DESCRIPTION OF THE INVENTION

Figure 1:
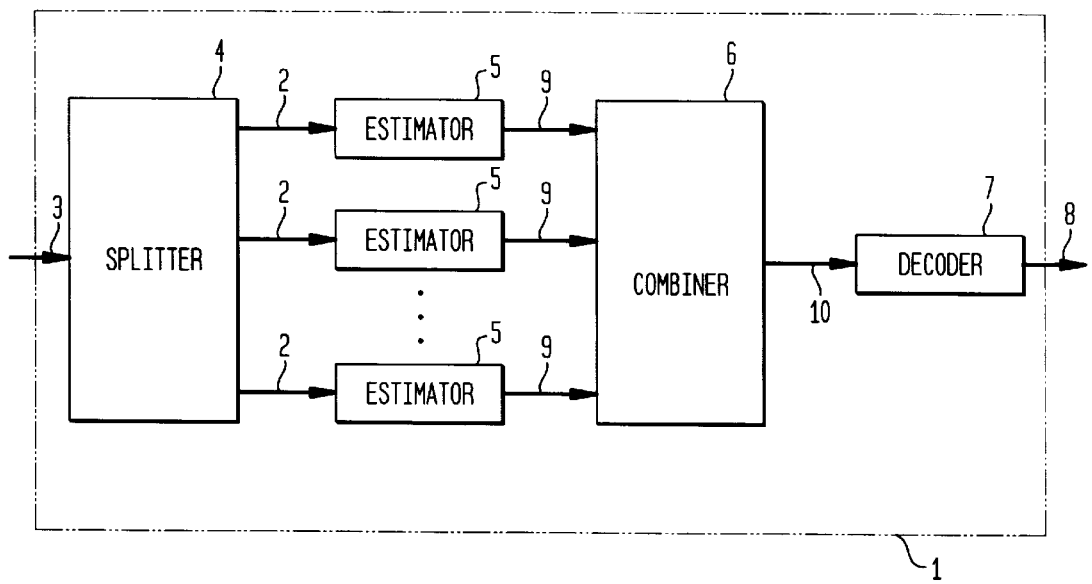
FIG. 1 depicts a device according to one embodiment of the present invention for estimating data symbols contained in a QAM sequence using multiple offset sequences transmitted over a flat-fading channel.

Referring first to FIG. 1, there is shown a device 1 according to one embodiment of the present invention. The present invention uses multiple offset sequences 2 to estimate data symbols which make up an input sequence 3. The device 1 comprises: a splitter or splitting means 4; multiple, independent sequence estimators or sequence estimating means 5; a combiner or combining means 6; and a decoder or decoding means 7.

As shown, a splitter 4 may be adapted to divide an input-sequence 3 into multiple independent sequences 2, each sequence being staggered from one another in time. The sequence 3 comprises a QAM signal such as an M-PSK modulated signal. For now, the exact symbols in the sequence 3 are unknown and must, therefore, be computed by the device 1. The sequences 2 are input into estimators 5. The sequence estimators 5 may be adapted to generate tentative estimations 9 of the transmitted symbols and independent estimates 9 of the fading process of each of the sequences 2. The diversity which is created due to the generation of multiple, independent estimates of the fading process provides an improvement in performance and more specifically a reduction in bit error rates for M-PSK schemes. It should be understood, however, that other QAM signals besides M-PSK signals may be used as well. It should also be understood that the splitter 4 may be adapted to receive the single sequence of symbols 3 using one or more antennas (not shown) creating a number of antenna diversities.

After the estimates 9 are generated they may then be output to a combiner 6. The combiner 6 may be adapted to combine the independent estimates of the fading process and generate final estimates of the fading process. The generated estimates 10 are then input into decoder 7 which may be adapted to generate and output a final, estimated value 8 for each of the data symbols contained in sequence 3. The decoder 7 generates the final sequence estimation using hard or soft metric computations.

The operation of the device 1 will now be discussed in greater detail. Assume that a transmitted sequence of N symbols is given by s(n), n=0, . . . ,N−1 selected from the alphabet 0, . . . ,M−1, and that a corresponding, received sequence of samples 2 are given by $r_1(n)$, where l=0, . . . , L−1 indicates an l-th antenna diversity. Assume that the sequence 3 is to be split into P multiple sequences. For convenience, it will be assumed that N is an integral multiple of P and that there are P known pilot symbols at the start and end of the sequence. It should be understood that the number of pilot symbols may depend on the type of estimation method and/or type of sequence estimators being used. For example, a QAM/M-PSK sequence requires at least one known pilot symbol to establish an absolute reference due to rotational ambiguities known to occur in such schemes. In some instances, no pilot symbol is needed at all. In still other examples, the number of P sequences need not equal the number of pilot symbols.

Figure 2:
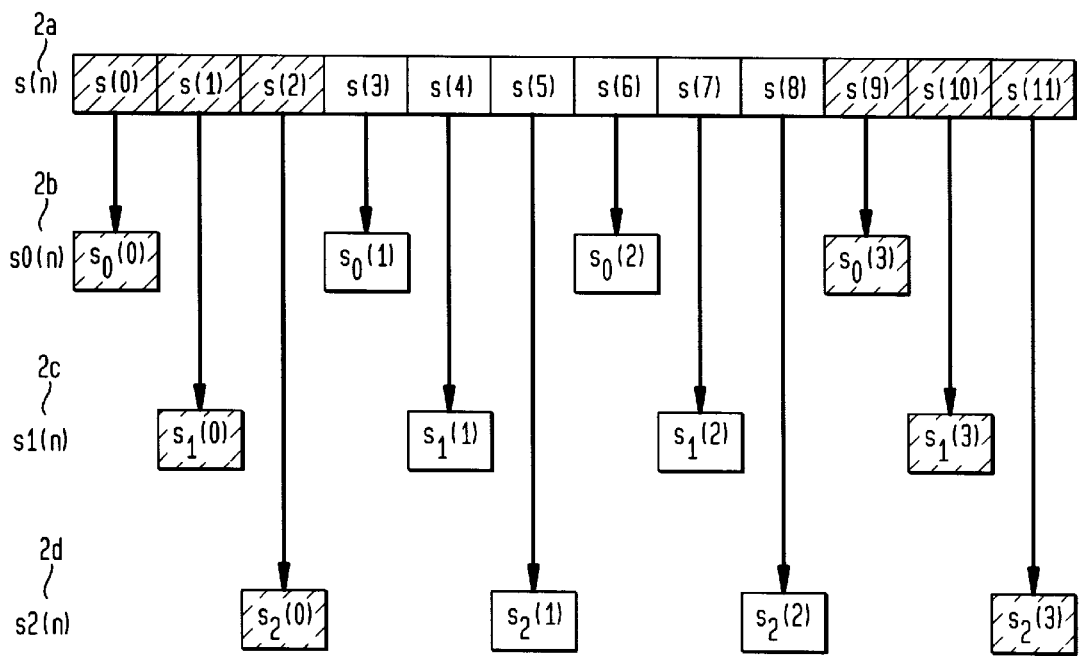
FIG. 2 depicts a diagram of multiple offset sequences according to an embodiment of the present invention.

Continuing, P subsequences of s(n) and $r_1(n)$ can be defined as: $s_p(n)=s(nP+p)$ and $r_{1,p}(n)=r_1(nP+p)$ where p=0, . . . ,P−1, n=0, . . . ,$N_p$−1 with $N_p$=N/P and l=0, . . . ,L−1. Note that $s_p(0)$ and $s_p(N_p-1)$ are known for all p. FIG. 2 depicts original subsequence 2a and staggered subsequences 2b through 2d created by the splitter 4 for the specific case where N=12 and P=3 with the known pilot symbols shaded.

Once the sequence 3 has been split into P sequences with known pilot symbols at the beginning and end, the next step is to independently generate an estimate of the sequence of symbols in each sequence.

In one embodiment of the invention, the estimators 5 generate an estimate of the symbols using a Per-Survivor Processing, Least Mean Square ("PSP/LMS") process known to those in the art. In other embodiments of the invention, Recursive Least Square ("RLS") or a Kalman filtering process may be used by the estimators 5. The PSP/LMS, RLS and Kalman filtering processes are referred to as "adaptive" processes. In still other embodiments of the invention, non-adaptive processes, such as a "fixed linear prediction" process, may be used by the estimators 5.

The estimators 5 may be further adapted to generate estimates of the symbols in each of the sequences 2 by Viterbi scoring and "path trace back," processes known by those in the art.

In one embodiment of the invention, once these initial symbol estimates are generated, the estimators 5 then generate noisy estimates of the fading process, one per antenna diversity per sequence, using processes well known in the art.

There are a few observations with respect to the multi-sequence estimation process worth mentioning. First, because every P-th sample is taken from the original sequence 3 to derive each subsequence 2, the fading process for each subsequence 2 appears to have a maximum doppler shift of P times that of the original sequence 3. That is, if the original sequence 3 represented a wireless transmission, for example, and the wireless transmitter was traveling at 100 km/hr, the apparent speed as seen by a subsequence 2 would be 300 km/hr. Because of this, using multiple subsequences 2 to generate estimations is more difficult than using one original sequence 3. This also places a limit on the maximum value of P. P must be chosen such that there is still significant correlation between successive samples of the fading process so that past values of the fading process can be used to reliably predict future values. For example, it has been found that at a frequency of 1.9 GHz and speeds up to 100 km/hr ($f_d$=176 Hz, where $f_d$ is the maximum Doppler frequency), the benefits of the added diversity realized through the use of multiple, offset sequences 2, outweighs any degradation in the estimation process for reasonable values of P, at least up to P=4.

Secondly, as mentioned before, the present invention is directed at flat-fading channels and it is unknown if the present invention can be extended to non-flat fading environments, i.e., dispersive environments where inter-symbol interference must be taken into account. Third, the computational requirements of the present invention are slightly less than that required by a single, full sequence estimator using a PSP/LMS process. The shorter the overall length of the original sequence 3, the larger the savings.

Continuing, the combiner 6 combines the P, non-overlapping sequences 9 of noisy fading channel estimates generated by the estimators 5 and then generates a single sequence 10 of channel fading estimates.

A simplified example of how the phase combiner 6 operates is as follows. Suppose first that noise causes a phase slip for several symbols in only one of the subsequences 2, which causes errors to occur in the fading process estimate for that sequence. Because the noise is assumed independent for each sequence, it is likely that sequence estimates from the other staggered sequences will not exhibit the same phase slip. In one embodiment, the phase combiner 6 must use P−1 out of every P symbols of good channel estimates to correct the 1 out of every P bad channel estimates. It should be realized that this example represents a simplified case where all of the errors occur in a single subsequence. In reality, errors may be spread over a number of subsequences.

In another embodiment of the present invention, the combiner 6 is adapted to interleave the P sequences 9 of noisy fading channel estimates for each diversity and is further adapted to apply a smoothing filter known in the art which produces smoothed sequences of fading channel estimates 10, one sequence for each diversity. In addition to combining the multiple channel estimates, this also reduces noise from each of the estimates. The interleaved sequence of channel estimates for the 1-th diversity before smoothing is given by:

$$\tilde{h}_1(m) = \tilde{h}_{1,p}(n)$$

where p=m mod P, n=Int(m/P) and m=0, . . . ,N−1. The term on the right hand side of this equation is the noisy estimate of the fading process for the 1-th antenna diversity of the pth subsequence at symbol n which results from the estimation process applied to each of the subsequences. It should be understood that this equation is valid for embodiments where the estimates of the subsequences are interleaved back together into a single sequence based on using every P-th sample in each subsequence. Other embodiments which use different splitting techniques, i.e., something other than every P-th sample, would be governed by a different equation.

Once the smoothed sequence 10 is generated it is sent to decoder 7. The decoder 7 may comprise a "hard decision bit" decoder for generating hard bit decisions. A straightforward slicing operation known in the art may be used to directly generate final estimates 8 of the transmitted symbols 3 which may then be mapped to bits, usually through Gray encoding or the like to minimize the number of bit errors.

In another embodiment of the invention the decoder 7 may comprise a soft metric decoder. Such a decoder is typically adapted to complete Viterbi channel decoding. Viterbi channel decoding is used if the original bits have been encoded with a convolutional coder for error correction. Soft metric decoding gives a measure of the quality of each demodulated bit. In one embodiment of the invention, the soft metric decoder 7 is further adapted to compute the "Euclidean distance" between the received signal 3 and M possible constellation points that have been modulated by the estimate of a fading process. Next, if the Gray encoded bits associated with each constellation point are provided, the minimum distance for each bit assuming a 0 value and the minimum distance for each bit assuming a 1 value may be found.

Figure 3:
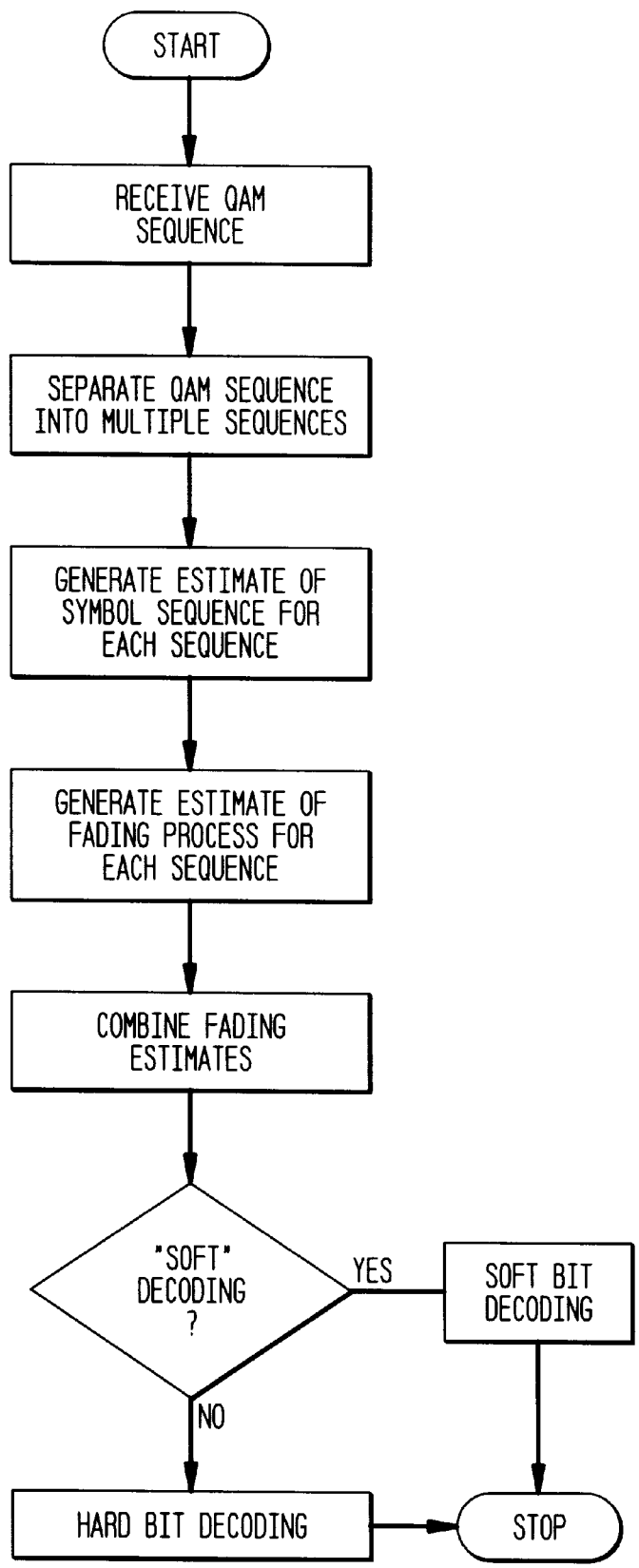
FIG. 3 depicts a flow diagram of methods for estimating data symbols contained in a QAM sequence using multiple offset sequences transmitted over a flat-fading channel according to another embodiment of the present invention.

Though the present invention has been described with reference to the device shown in FIG. 1, the present invention may also be realized using a number of methods applied to a device or devices similar to the one shown in FIG. 1. FIG. 3 depicts a flow diagram of exemplary methods.

Though shown as being a part of device 1, the components of device 1 may be realized in any number of components or devices.

It is to be understood that changes and variations may be made without departing from the spirit and scope of this invention as defined by the claims that follow.

I claim:

1. A method for estimating QAM symbol sequences over flat-fading channels comprising:

separating a first sequence of symbols into second sequences of symbols, each separated sequence being offset from another separated sequence;

generating an estimate for each of the second sequences using a sequence estimation algorithm;

generating an estimate of a fading process for each of the second sequences using the respective, estimated sequence of symbols;

combining the estimates of the fading process from each of the second sequences; and generating a third, single sequence of estimates of the fading process from the combined sequences.

2. The method as in claim 1 further comprising decoding symbols from the third sequence of estimates.

3. The method as in claim 1 wherein the first sequence of symbols comprises a number of known pilot symbols at the beginning and end of the sequence.

4. The method as in claim 3 wherein the number of known pilot symbols is equal to 1.

5. The method as in claim 3 wherein the number of known pilot symbols is selected to maintain a substantial correlation between each estimate of the fading process derived from each of the second sequences.

6. The method as in claim 1 wherein the second sequences are non-overlapping.

7. The method as in claim 1 wherein estimating the fading process for each of the second sequences further comprises estimating a noisy estimate of the fading process.

8. The method as in claim 1 wherein combining the estimates of the fading process from each of the second sequences further comprises interleaving the sequences.

9. The method as in claim 2 wherein decoding symbols further comprises slicing the third sequence to identify hard bits.

10. The method as in claim 2 wherein decoding further comprises decoding the third sequence to identify soft bits.

11. The method as in claim 1 wherein the QAM sequences comprise M-PSK sequences.

12. The method as in claim 1 further comprising receiving the first sequence of symbols using multiple antennas.

13. A device for estimating QAM symbol sequences over flat-fading channels comprising:

a splitter adapted to split a first sequence of symbols into second sequences of symbols, each separated sequence being offset from another separated sequence;

estimators adapted to generate estimates for each of the second sequences using a sequence estimation algorithm and further adapted to generate estimates of a fading process for each of the second sequences using the respective, estimated sequence of symbols; and a combiner adapted to combine the estimates of the fading process from each of the second sequences and further adapted to generate a third, single sequence of estimates of the fading process from the combined sequences.

14. The device as in claim 13 further comprising a decoder adapted to decode symbols from the third sequence of estimates.

15. The device as in claim 13 wherein the first sequence of symbols comprises a number of known pilot symbols at the beginning and end of the sequence.

16. The device as in claim 15 wherein the number of known pilot symbols is equal to 1.

17. The device as in claim 15 wherein the number of known pilot symbols is selected to maintain a substantial correlation between each estimate of the fading process derived from each of the second sequences.

18. The device as in claim 13 wherein the second sequences are non-overlapping.

19. The device as in claim 13 wherein the estimators are further adapted to estimate noisy estimates of the fading process for each of the second sequences.

20. The device as in claim 13 wherein the combiner is further adapted to interleave each of the second sequences.

21. The device as in claim 14 wherein the decoder is further adapted to slice the third sequence to identify hard bits.

22. The device as in claim 14 wherein the decoder is further adapted to decode the third sequence to identify soft bits.

23. The device as in claim 13 wherein the QAM sequences comprise M-PSK sequences.

24. The device as in claim 13 wherein the splitter is further adapted to receive the first sequence of symbols using multiple antennas.

25. A device for estimating QAM symbol sequences over flat-fading channels comprising:

splitting means for splitting a first sequence of symbols into second sequences of symbols, each separated sequence being offset from another separated sequence;

estimating means for generating estimates for each of the second sequences using a sequence estimation algorithm and for generating estimates of a fading process for each of the second sequences using the respective, estimated sequence of symbols; and combining means for combining the estimates of the fading process from each of the second sequences and for generating a third, single sequence of estimates of the fading process from the combined sequences.

26. The device as in claim 25 further comprising decoding means for decoding symbols from the third sequence of estimates.

27. The device as in claim 25 wherein the first sequence of symbols comprises a number of known pilot symbols at the beginning and end of the sequence.

28. The device as in claim 27 wherein the number of known pilot symbols is equal to 1.

29. The device as in claim 27 wherein the number of known pilot symbols is selected to maintain a substantial correlation between each estimate of the fading process derived from each of the second sequences.

30. The device as in claim 25 wherein the second sequences are non-overlapping.

31. The device as in claim 25 wherein the estimating means further comprises estimating noisy estimates of the fading process for each of the second sequences.

32. The device as in claim 25 wherein the combining means further comprises interleaving each of the second sequences.

33. The device as in claim 26 wherein the decoding means further comprises slicing the third sequence to identify hard bits.

34. The device as in claim 26 wherein the decoding means further comprises decoding the third sequence to identify soft bits.

35. The device as in claim 25 wherein the QAM sequences comprise M-PSK sequences.

36. The device as in claim 25 wherein the splitting means is further adapted to receive the first sequence of symbols using multiple antennas.

\* \* \* \* \*